United States Patent
Kim

(10) Patent No.: US 10,748,531 B2
(45) Date of Patent: Aug. 18, 2020

(54) MANAGEMENT LAYER FOR MULTIPLE INTELLIGENT PERSONAL ASSISTANT SERVICES

(71) Applicant: Harman International Industries, Inc., Stamford, CT (US)

(72) Inventor: Seon Man Kim, Palo Alto, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 57 days.

(21) Appl. No.: 15/487,347

(22) Filed: Apr. 13, 2017

(65) Prior Publication Data

US 2018/0301147 A1    Oct. 18, 2018

(51) Int. Cl.
| | |
|---|---|
| *G10L 15/22* | (2006.01) |
| *G10L 15/08* | (2006.01) |
| *G10L 15/02* | (2006.01) |
| *G06F 16/683* | (2019.01) |
| *G06F 3/16* | (2006.01) |

(52) U.S. Cl.
CPC .............. *G10L 15/22* (2013.01); *G06F 3/167* (2013.01); *G06F 16/685* (2019.01); *G10L 15/02* (2013.01); *G10L 15/08* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 6,397,186 B1 * | 5/2002 | Bush | ....................... | G06F 3/167 704/274 |
| 6,446,076 B1 * | 9/2002 | Burkey | ................... | G06F 9/451 704/270.1 |
| 6,526,380 B1 * | 2/2003 | Thelen | .................... | G10L 15/32 704/251 |
| 6,542,868 B1 * | 4/2003 | Badt | ....................... | G10L 13/00 704/270 |
| 6,757,655 B1 * | 6/2004 | Besling | ................... | G10L 15/26 704/270.1 |
| 7,058,573 B1 * | 6/2006 | Murveit | .................. | G10L 15/08 704/229 |

(Continued)

OTHER PUBLICATIONS

Extended European Search Report for Application No. 18166830.2 dated Jun. 7, 2018.

*Primary Examiner* — Jonathan C Kim
(74) *Attorney, Agent, or Firm* — Artegis Law Group, LLP

(57) ABSTRACT

Performing speech recognition in a multi-device system includes receiving a first audio signal that is generated by a first microphone in response to a verbal utterance, and a second audio signal that is generated by a second microphone in response to the verbal utterance; dividing the first audio signal into a first sequence of temporal segments; dividing the second audio signal into a second sequence of temporal segments; comparing a sound energy level associated with a first temporal segment of the first sequence to a sound energy level associated with a first temporal segment of the second sequence; based on the comparing, selecting, as a first temporal segment of a speech recognition audio signal, one of the first temporal segment of the first sequence and the first temporal segment of the second sequence; and performing speech recognition on the speech recognition audio signal.

12 Claims, 5 Drawing Sheets

(56) References Cited

U.S. PATENT DOCUMENTS

| | | | |
|---|---|---|---|
| 7,490,039 B1* | 2/2009 | Shaffer | G10L 13/08 704/260 |
| 7,917,364 B2* | 3/2011 | Yacoub | G10L 15/32 704/231 |
| 8,239,206 B1 | 8/2012 | LeBeau et al. | |
| 8,606,581 B1* | 12/2013 | Quast | G10L 15/32 704/254 |
| 8,990,079 B1* | 3/2015 | Newman | G10L 15/22 704/214 |
| 9,305,554 B2* | 4/2016 | Jagatheesan | G10L 15/183 |
| 9,307,080 B1* | 4/2016 | Fernandez | H04M 3/367 |
| 9,508,345 B1 | 11/2016 | Murgia | |
| 9,653,082 B1* | 5/2017 | Jochumson | G10L 15/30 |
| 9,734,830 B2* | 8/2017 | Lindahl | G10L 15/23 |
| 9,886,953 B2* | 2/2018 | Lemay | G10L 15/28 |
| 9,966,065 B2* | 5/2018 | Gruber | G10L 15/28 |
| 10,235,996 B2* | 3/2019 | Renard | G10L 15/18 |
| 2002/0046023 A1* | 4/2002 | Fujii | G10L 15/30 704/231 |
| 2002/0055844 A1* | 5/2002 | L'Esperance | H04M 1/271 704/260 |
| 2002/0194000 A1* | 12/2002 | Bennett | G10L 15/32 704/270 |
| 2003/0028382 A1* | 2/2003 | Chambers | G10L 15/26 704/275 |
| 2003/0081739 A1* | 5/2003 | Hikishima | H04M 1/6058 379/88.01 |
| 2003/0115053 A1* | 6/2003 | Eide | G10L 15/32 704/231 |
| 2003/0125940 A1* | 7/2003 | Basson | G10L 15/30 704/231 |
| 2004/0117179 A1* | 6/2004 | Balasuriya | G10L 15/32 704/231 |
| 2005/0055205 A1* | 3/2005 | Jersak | G10L 15/22 704/233 |
| 2005/0131685 A1* | 6/2005 | Roth | G10L 15/005 704/231 |
| 2005/0240404 A1* | 10/2005 | Gurram | G10L 15/32 704/231 |
| 2005/0240786 A1* | 10/2005 | Ranganathan | G06F 1/3215 713/320 |
| 2006/0178882 A1* | 8/2006 | Braho | G10L 15/08 704/240 |
| 2007/0016401 A1* | 1/2007 | Ehsani | G06F 40/55 704/9 |
| 2009/0204409 A1* | 8/2009 | Mozer | G10L 15/30 704/275 |
| 2009/0204410 A1* | 8/2009 | Mozer | G10L 15/30 704/275 |
| 2009/0299745 A1* | 12/2009 | Kennewick | G10L 15/22 704/257 |
| 2012/0078626 A1* | 3/2012 | Tsai | G10L 15/26 704/235 |
| 2012/0191449 A1* | 7/2012 | Lloyd | H04M 1/6075 704/231 |
| 2012/0215539 A1* | 8/2012 | Juneja | G10L 15/30 704/254 |
| 2013/0073293 A1* | 3/2013 | Jang | G10L 15/22 704/275 |
| 2013/0080146 A1* | 3/2013 | Kato | G06F 40/40 704/2 |
| 2013/0080167 A1* | 3/2013 | Mozer | G10L 17/22 704/246 |
| 2013/0085755 A1 | 4/2013 | Bringert et al. | |
| 2013/0211822 A1* | 8/2013 | Sakai | G10L 15/1815 704/9 |
| 2013/0275164 A1* | 10/2013 | Gruber | G10L 17/22 705/5 |
| 2013/0289994 A1* | 10/2013 | Newman | H04M 1/72519 704/254 |
| 2013/0289996 A1* | 10/2013 | Fry | G10L 15/32 704/257 |
| 2013/0322665 A1* | 12/2013 | Bennett | G08G 1/096855 381/300 |
| 2013/0339028 A1* | 12/2013 | Rosner | G10L 15/222 704/275 |
| 2014/0136215 A1* | 5/2014 | Dai | G10L 15/22 704/275 |
| 2014/0214429 A1* | 7/2014 | Pantel | G06F 3/167 704/275 |
| 2014/0274203 A1* | 9/2014 | Ganong, III | H04W 52/0251 455/556.1 |
| 2014/0274211 A1* | 9/2014 | Sejnoha | H04M 1/72519 455/563 |
| 2014/0280292 A1* | 9/2014 | Skinder | G06F 16/3338 707/767 |
| 2014/0310002 A1* | 10/2014 | Nitz | G10L 15/1822 704/270.1 |
| 2014/0330896 A1* | 11/2014 | Addala | H04L 67/1095 709/203 |
| 2014/0337036 A1* | 11/2014 | Haiut | G10L 15/20 704/275 |
| 2014/0365885 A1* | 12/2014 | Carson | G06F 3/04842 715/708 |
| 2015/0025890 A1* | 1/2015 | Jagatheesan | G10L 15/30 704/255 |
| 2015/0077126 A1* | 3/2015 | Wang | G01R 31/3646 324/428 |
| 2015/0088506 A1* | 3/2015 | Obuchi | G10L 15/08 704/236 |
| 2015/0112690 A1* | 4/2015 | Guha | G10L 25/48 704/275 |
| 2015/0142447 A1* | 5/2015 | Kennewick | G10L 15/285 704/275 |
| 2015/0169284 A1* | 6/2015 | Quast | G06F 16/9535 704/275 |
| 2015/0221305 A1* | 8/2015 | Sharifi | G10L 15/26 704/235 |
| 2015/0221307 A1* | 8/2015 | Shah | G06F 3/165 704/253 |
| 2015/0221308 A1* | 8/2015 | Suzuki | G01C 21/3608 701/539 |
| 2015/0279352 A1* | 10/2015 | Willett | G10L 15/30 704/231 |
| 2015/0348551 A1* | 12/2015 | Gruber | H04M 3/4936 704/235 |
| 2015/0364129 A1* | 12/2015 | Gonzalez-Dominguez | G10L 15/005 704/251 |
| 2015/0379992 A1* | 12/2015 | Lee | G06F 3/165 704/275 |
| 2016/0027440 A1* | 1/2016 | Gelfenbeyn | G10L 15/32 704/244 |
| 2016/0098992 A1 | 4/2016 | Renard et al. | |
| 2016/0104480 A1* | 4/2016 | Sharifi | G10L 15/01 704/254 |
| 2016/0104482 A1* | 4/2016 | Aleksic | G10L 15/22 704/235 |
| 2016/0111091 A1* | 4/2016 | Bakish | G10L 15/22 704/275 |
| 2016/0180844 A1* | 6/2016 | VanBlon | G10L 15/222 704/275 |
| 2016/0210965 A1* | 7/2016 | Mun | G10L 15/22 |
| 2016/0217795 A1* | 7/2016 | Lee | G10L 15/32 |
| 2016/0240193 A1* | 8/2016 | Gulati | G10L 15/28 |
| 2016/0259622 A1* | 9/2016 | Kim | G06F 3/167 |
| 2016/0259775 A1* | 9/2016 | Gelfenbeyn | G10L 15/22 |
| 2016/0260431 A1* | 9/2016 | Newendorp | G06F 3/167 |
| 2016/0260434 A1 | 9/2016 | Gelfenbeyn et al. | |
| 2016/0358619 A1* | 12/2016 | Ramprashad | G10L 15/34 |
| 2017/0011210 A1* | 1/2017 | Cheong | G06F 3/017 |
| 2017/0017694 A1* | 1/2017 | Roytman | G06F 16/24564 |
| 2017/0031420 A1* | 2/2017 | Wong | H04W 52/0254 |
| 2017/0076720 A1* | 3/2017 | Gopalan | G10L 15/22 |
| 2017/0083285 A1* | 3/2017 | Meyers | G10L 15/063 |
| 2017/0090864 A1* | 3/2017 | Jorgovanovic | G06F 3/167 |
| 2017/0092270 A1* | 3/2017 | Newendorp | G10L 15/22 |
| 2017/0140756 A1* | 5/2017 | Sharifi | G10L 15/26 |

(56) References Cited

U.S. PATENT DOCUMENTS

| | | | |
|---|---|---|---|
| 2017/0153694 A1* | 6/2017 | Baldwin | G06F 1/3212 |
| 2017/0162197 A1* | 6/2017 | Cohen | G06F 3/012 |
| 2017/0357478 A1* | 12/2017 | Piersol | G06F 3/167 |
| 2018/0025731 A1* | 1/2018 | Lovitt | G10L 15/285 |
| | | | 704/255 |
| 2018/0040324 A1* | 2/2018 | Wilberding | G06F 3/167 |
| 2018/0061420 A1* | 3/2018 | Patil | G10L 17/22 |
| 2018/0063326 A1* | 3/2018 | Tichauer | H04M 3/4936 |
| 2018/0095963 A1* | 4/2018 | Verma | G06F 16/3338 |
| 2018/0096284 A1* | 4/2018 | Stets | G10L 15/22 |
| 2018/0108343 A1* | 4/2018 | Stevans | G10L 15/22 |
| 2018/0122376 A1* | 5/2018 | Kojima | G10L 15/22 |
| 2018/0182397 A1* | 6/2018 | Carbune | G10L 15/30 |
| 2018/0190264 A1* | 7/2018 | Mixter | H04L 12/282 |
| 2018/0190274 A1* | 7/2018 | Kirazci | G10L 15/1815 |
| 2018/0204569 A1* | 7/2018 | Nadkar | G10L 15/22 |
| 2018/0228006 A1* | 8/2018 | Baker | H05B 47/105 |

* cited by examiner

MANAGEMENT LAYER FOR MULTIPLE INTELLIGENT PERSONAL ASSISTANT SERVICES

FIELD OF THE CLAIMED EMBODIMENTS

Embodiments of the present invention relate generally to intelligent personal assistant services and, more specifically, to a management layer for multiple intelligent personal assistant services.

DESCRIPTION OF THE RELATED ART

An intelligent personal assistant (IPA) is a software agent or other application that can perform tasks or services for a user based on verbal input provided by the user. An IPA can enable certain tasks to be performed for a user based on spoken requests, thereby circumventing the need for the user to provide manual input via a touchscreen, keyboard, mouse, or other input device. For example, information can be accessed for a user from a variety of online sources via the IPA (e.g., weather, traffic conditions, news, stock prices, user schedules, retail prices, etc.). Further, information-based tasks can be completed for the user by the IPA (e.g., management of emails, calendar events, files, to-do lists, and the like).

Recently, various types of IPAs, such as Microsoft Cortana™, Apple Siri™, Google Home™, and Amazon Alexa™, have become widely used by consumers. However, as the number of IPA services available to consumers increases, problems can arise. Specifically, while it is now possible for a user to have subscriptions with multiple IPA services, convenient access to each IPA from a single device, such as a smartphone or smart speaker, can be problematic.

Currently, a user generally needs a different device to access each different IPA service, which is both redundant and cumbersome. For instance, a user cannot simply direct one question to a first IPA service via one device and then direct another (or the same) question to a second IPA service via another device, since the devices will likely interfere with each other when the responses from the first and second IPA services are received. Instead, the user can only ask one question of one IPA service and then wait for the response before asking any questions of any other IPA services. Consequently, a user is prevented from enjoying a natural and convenient user experience that approximates interacting with multiple human assistants at the same time.

Alternatively, some smart devices may be configured to support multiple IPA services. However, in such devices, a single IPA service is necessarily configured as the default service. Consequently, in order to access other IPA services, a user must reconfigure the device to modify the default IPA service. Because switching to a different default IPA service is cumbersome and time-consuming, such an approach also prevents a user from enjoying a natural and convenient user experience when interacting with multiple IPA services.

Accordingly, improved techniques for managing multiple IPA services in a single device would be useful.

SUMMARY

The various embodiments set forth a non-transitory computer-readable medium including instructions that, when executed by one or more processors, configure the one or more processors to manage interactions with multiple intelligent personal assistants (IPAs) applications by performing the steps of detecting an activation phrase within a first audio signal; based on the activation phrase, selecting an intelligent personal assistant (IPA) that is included in a group of candidate IPAs; extracting query content from the first audio signal; generating a second audio signal based on the query content; and transmitting the second audio signal to the IPA.

At least one advantage of the disclosed embodiments is that a user can issue one voice command to multiple IPAs via a single smart device and receive a response from each IPA in a particular order, without the IPA services interfering with one another. A further advantage is that the user can direct voice commands to one or more of the multiple IPAs using more conversational and natural syntax than permitted by conventional techniques.

BRIEF DESCRIPTION OF THE SEVERAL VIEWS OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the various embodiments may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
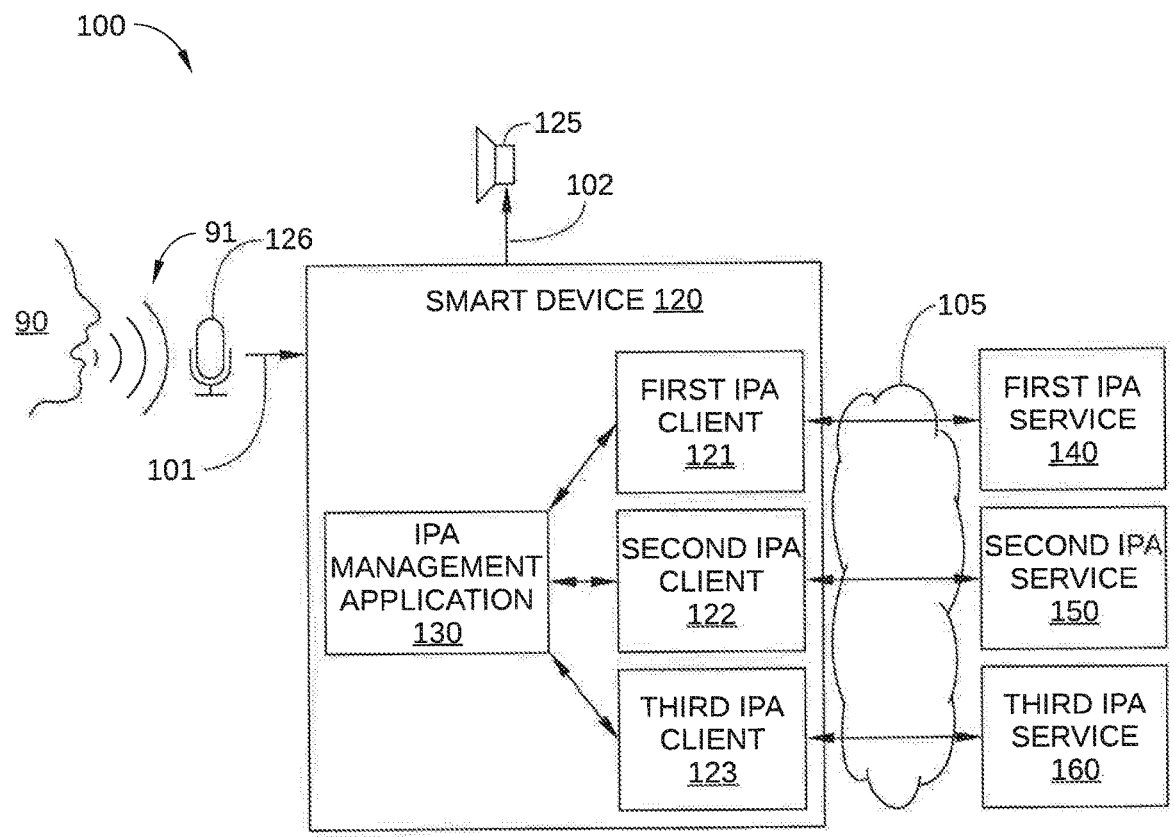
FIG. 1 is a schematic diagram illustrating an intelligent personal assistant (IPA) management system, configured to implement one or more aspects of the various embodiments.

FIG. 1 is a schematic diagram illustrating an intelligent personal assistant (IPA) management system 100, configured to implement one or more aspects of the various embodiments. IPA management system 100 includes a smart device 120, a first IPA service 140, a second IPA service 150, and a third IPA service 160, all communicatively connected to each other via a communication network 105. Also shown in FIG. 1 is a user 90, who generates a user request via a verbal utterance 91. In some embodiments, multi-device IPA system 100 includes more than or fewer than the three IPA services illustrated in FIG. 1.

Communication network 105 may be any technically feasible type of communications network that allows data to be exchanged between smart device 120, first IPA service 140, second IPA service 150, third IPA service 160, and/or other entities or devices, such as a web server or another networked computing device. For example, communication network 105 may include a wide area network (WAN), a local area network (LAN), a wireless (WiFi) network, wireless personal area network (WPAN) (such as a Bluetooth network), and/or the Internet, among others. Thus, in some embodiments, communication network 105 may include one or more additional network devices that are not shown in FIG. 1, such as a WiFi router.

Each of first IPA service 140, second IPA service 150, and third IPA service 160 may be a different commercially available IPA service, such as Microsoft Cortana™, Apple Siri™, Google Home™, or Amazon Alexa™, among others. As such, each IPA service may be configured to receive query content from a smart device (such as smart device 120), act on the query, and provide a suitable response, such as an answer to a user question or an acknowledgement of a requested action being completed. Generally, the query content received by first IPA service 140, second IPA service 150, and/or third IPA service 160 may be in the form of either audio data or text. Similarly, the response provided by first IPA service 140, second IPA service 150, and/or third IPA service 160 to smart device 120 may be in the form of either audio data or text.

Smart device 120 is an IPA-compatible computing device configured to receive certain voice commands from a user, direct query content included in such commands to one or more of first IPA service 140, second IPA service 150, and/or third IPA service 160 as appropriate, and manage responses received from first IPA service 140, second IPA service 150, and/or third IPA service 160. Thus, smart device 120 is configured with an IPA service management layer. To that end, smart device 120 includes an IPA management application 130, a first IPA client 121, a second IPA client 122, and a third IPA client 123. IPA management application 130 is described in greater detail below. First IPA client 121 is configured to send data to and receive data from first IPA service 140, second IPA client 122 is configured to send data to and receive data from second IPA service 150, and third IPA client 123 is configured to send data to and receive data from third IPA service 160. In some embodiments, the functionality of first IPA client 121 is based on the application program interface (API) of first IPA service 140, the functionality of second IPA client 122 is based on the API of second IPA service 150, and the functionality of third IPA client 123 is based on the API of third IPA service 160. For example, in some embodiments, one of the IPA clients described above could interface with a corresponding IPA service according to an API defined by the IPA service.

In operation, IPA management application 130 detects an audio signal 101 that is generated, for example via a microphone 126, in response to receiving verbal utterance 91, and determines whether audio signal 101 includes any activation phrases, such as "OK Google," "Hello Siri," "Hey Alexa," etc. When one or more activation phrases are detected in audio signal 101, IPA management application 130 extracts query content from the audio signal, such as questions, commands to perform a specific task, etc., and determines the IPA service to which the query content should be sent. In addition, IPA management application 130 is configured to receive responses from first IPA service 140, second IPA service 150, and/or third IPA service 160, and cause each such response to be played sequentially by smart device 120, for example via an audio signal 102 played by a loudspeaker 125. Thus, user 90 can issue a series of voice commands to different IPA services via a single smart device, and playback of the responses from the various IPA services are managed so that each can be heard by user 90 individually.

Smart device 120 may be any stand-alone computing device operable to communicate via communication network 105 and execute IPA management application 130 and applications associated with the IPA management application 130. Examples of computing devices suitable for use as smart device 120 include, without limitation, a smart speaker, a smartphone, a home automation hub, an electronic tablet, a laptop computer, a desktop computer, and the like. Alternatively or additionally, smart device 120 may be a computing device that is operable to communicate via communication network 105 and is incorporated into an electronic device, consumer product, or other apparatus, including, without limitation, a video game console, a set top console, a digital video recorder, a home automation device, and the like. One embodiment of smart device 120 is described below in conjunction with FIG. 2.

Figure 2:
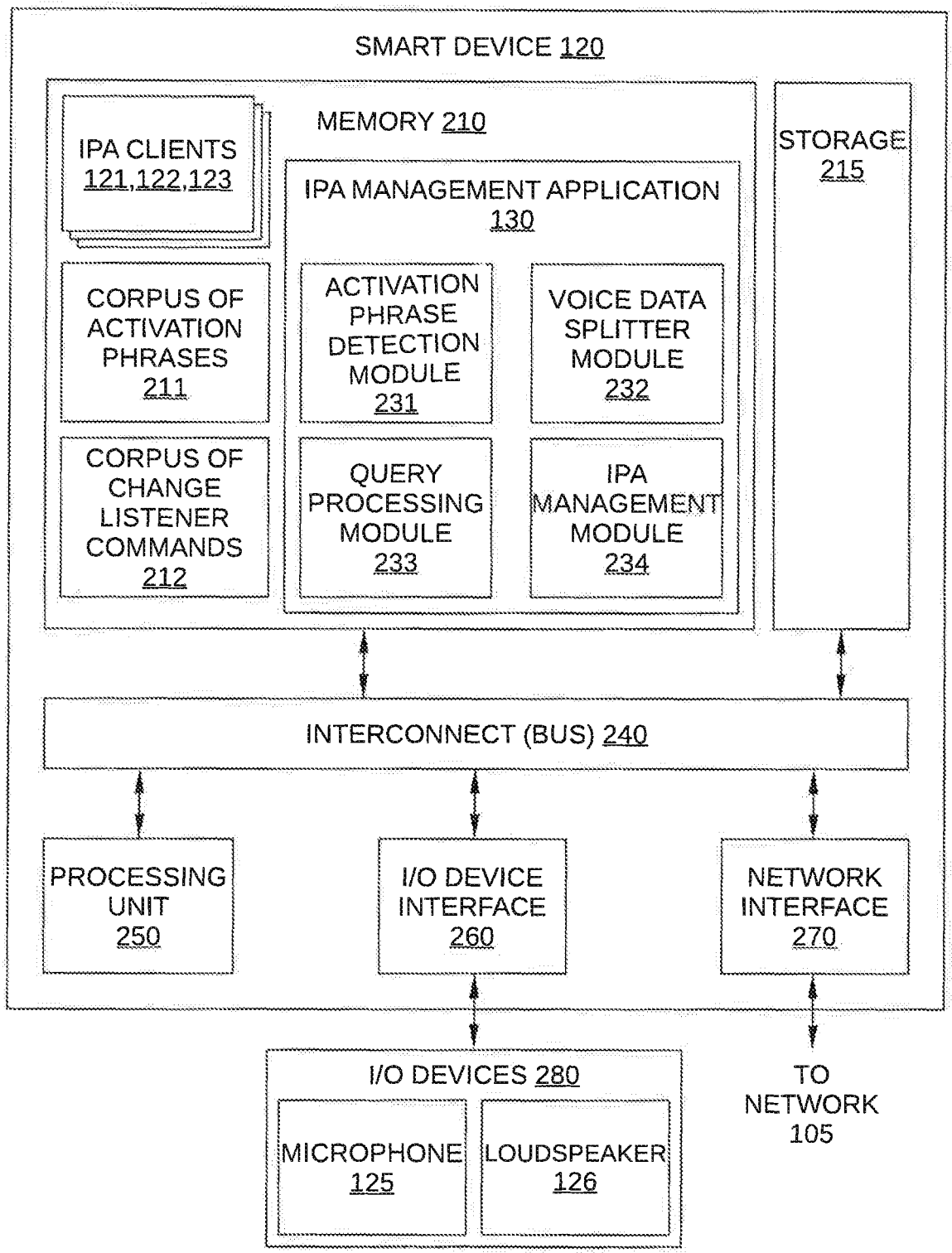
FIG. 2 illustrates a smart device configured to implement one or more aspects of the present disclosure.

FIG. 2 illustrates smart device 120 configured to implement one or more aspects of the present disclosure. As such, smart device 120 is configured to execute one or more of an IPA management application 130, a first IPA client 121, a second IPA client 122, and a third IPA client 123, each of which may reside in a memory 210. In some embodiments, IPA management application 130 may include one or more of an activation phrase detection module 231, a voice data splitter module 232, a query processing module 233, and an IPA communications management module 234. Smart device 120 is further configured to cause sound to be generated by loudspeaker 126, for example, by converting response audio signal received from one or more IPA services to sound energy. It is noted that the computing device described herein is illustrative and that any other technically feasible configurations fall within the scope of the present invention.

As shown, smart device 120 includes, without limitation, an interconnect (bus) 240 that connects a processing unit 250, an input/output (I/O) device interface 260 coupled to input/output (I/O) devices 280, memory 210, a storage 215 (e.g., a flash drive or hard disk drive), and a network interface 270. Processing unit 250 may be any suitable processor implemented as a central processing unit (CPU), an application-specific integrated circuit (ASIC), a field programmable gate array (FPGA), any other type of processing unit, or a combination of different processing units, such as a CPU configured to operate in conjunction with a digital signal processor (DSP). For example, in some embodiments, processing unit 250 includes a CPU and a DSP. In general, processing unit 250 may be any technically feasible hardware unit capable of processing data and/or executing software applications, including IPA management application 130, activation phrase detection module 231, voice data splitter module 232, query processing module 233, IPA communications management module 234, first IPA client 121, second IPA client 122, and third IPA client 123. Further, in the context of this disclosure, the computing elements shown in smart device 120 may correspond to a physical computing system (e.g., a system in a data center) or may be a virtual computing instance executing within a computing cloud. In such embodiments, speech recognition performed during operation of IPA management application 130, such as by activation phrase detection module 231, voice data splitter module 232, and/or query processing module 233, may be implemented via a speech recognition application running on a virtual computing instance executing within a computing cloud or server.

I/O devices 280 may include devices capable of providing input, such as a keyboard, a mouse, a touch-sensitive screen, a microphone 126 and so forth, as well as devices capable of providing output, such as a loudspeaker 125 and a display screen. The display screen may be a computer monitor, a video display screen, a display apparatus incorporated into a hand held device, or any other technically feasible display screen. Microphone 126 is configured to convert sound energy, such as verbal utterance 91, into an audio signal, such as audio signal 101. Loudspeaker 125 is configured to convert an audio signal, such as a response audio signal from one or more of first IPA service 140, second IPA service 150, and/or third IPA service 160, to sound energy.

I/O devices 280 may include additional devices capable of both receiving input and providing output, such as a touch-screen, a universal serial bus (USB) port, and so forth. Such I/O devices 280 may be configured to receive various types of input from an end-user of smart device 120, and also to provide various types of output to the end-user of smart device 120, such as displayed digital images or digital videos. In some embodiments, one or more of I/O devices 280 are configured to couple smart device 120 to communications network 105.

I/O interface 260 enables communication of I/O devices 280 with processing unit 250. I/O interface generally includes the requisite logic for interpreting addresses corresponding to I/O devices 280 that are generated by processing unit 250. I/O interface 260 may also be configured to implement handshaking between processing unit 250 and I/O devices 280, and/or generate interrupts associated with I/O devices 280. I/O interface 260 may be implemented as any technically feasible CPU, ASIC, FPGA, any other type of processing unit or device.

Network interface 270 is a computer hardware component that connects processing unit 250 to communication network 105. Network interface 270 may be implemented in smart device 120 as a stand-alone card, processor, or other hardware device. In embodiments in which communication network 105 includes a WiFi network or a WPAN, network interface 270 includes a suitable wireless transceiver. Alternatively or additionally, network interface 270 may be configured with cellular communication capability, satellite telephone communication capability, a wireless WAN communication capability, or other types of communication capabilities that allow for communication with communication network 105 and other computing devices 200 included in multi-device IPA system 100.

Memory 210 may include a random access memory (RAM) module, a flash memory unit, or any other type of memory unit or combination thereof. Processing unit 250, I/O device interface 260, and network interface 270 are configured to read data from and write data to memory 210. Memory 210 includes various software programs that can be executed by processor 250 and application data associated with said software programs, including IPA management application 130, activation phrase detection module 231, voice data splitter module 232, query processing module 233, IPA communications management module 234, first IPA client 121, second IPA client 122, and/or third IPA client 123. Activation phrase detection module 231, voice data splitter module 232, query processing module 233, and IPA communications management module 234 are described below in conjunction with FIG. 3.

In addition, memory 210 may include a corpus of activation phrases 211 and/or a corpus of change listener commands 212, as shown in FIG. 2. Alternatively or additionally, corpus of activation phrases 211 and/or corpus of change listener commands 212 may be stored in storage 215.

Corpus of activation phrases 211 includes some or all call words or wake words associated with each of first IPA service 140, second IPA service 150, and third IPA service 160. Such activation phrases generally include a name of one or more of first IPA service 140, second IPA service 150, or third IPA service 160, plus optionally one or more additional words or phrases. Examples include, without limitation, "Hey Google," "Alexa," "Hi Siri," "Hello Siri and Alexa," etc.

Corpus of change listener commands 212 includes words, phrases, or sentences associated with changing from one listener, i.e., one IPA service, to another listener, i.e., another IPA service. Thus, the change listener commands included in corpus of change listener commands 212 generally include a name of one of first IPA service 140, second IPA service 150, or third IPA service 160, plus additional words or phrases indicating that a human user is changing from directing a voice command from one IPA service to the IPA service associated with that name. In some embodiments, change listener commands may include phrases that indicate, in the context of a previous voice command received by IPA management application 130, that the previous voice command is now also directed to the IPA service named in the change listener command. For example, phrases that may be recognized as change listener commands include, without limitation, "How about you, Google," "What do you think, Siri?," "And you, Alexa?", etc.

In the embodiment illustrated in FIG. 2, memory 210 and storage 215 are illustrated as physical components incorporated into smart device 120. In other embodiments, memory 210 and/or storage 215 may be included in a distributed computing environment, such as a computing cloud.

Figure 3:
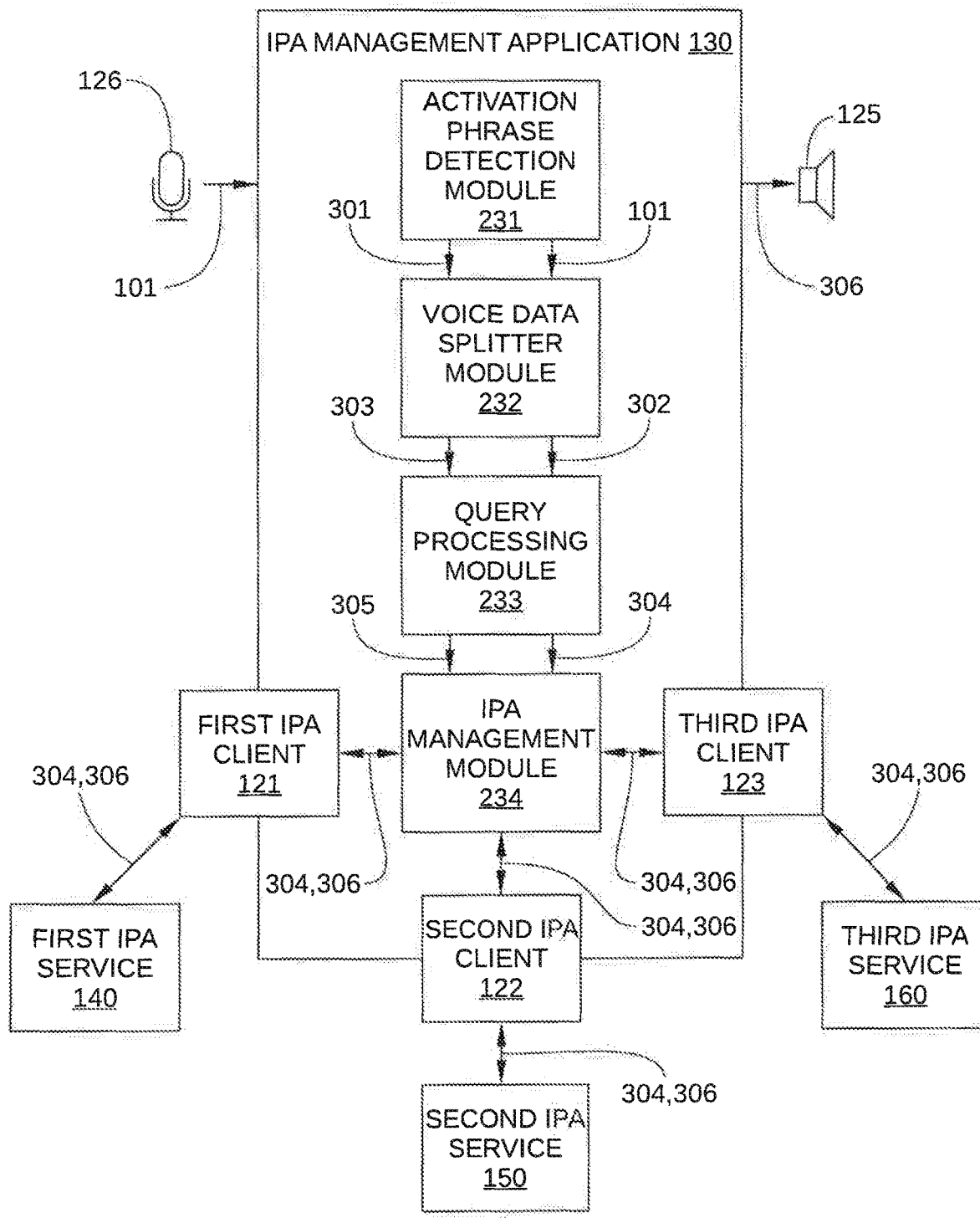
FIG. 3 is an operational diagram of the IPA management application of FIG. 1, according to various embodiments of the present disclosure.

FIG. 3 is an operational diagram of IPA management application 130, according to various embodiments of the present disclosure. In the embodiment illustrated in FIG. 3, IPA management application 130 includes activation phrase detection module 231, voice data splitter module 232, query processing module 233, and IPA communications management module 234. In addition, IPA management application 130 communicates with first IPA service 140, second IPA service 150, and third IPA service 160 via first IPA client 121, second IPA client 122, and third IPA client 123, respectively.

Activation phrase detection module 231 is configured to detect activation phrases included in audio signal 101 that are received from microphone 126. As such, activation phrase detection module 231 may include any technically feasible speech recognition algorithm or algorithms for converting speech to text. Activation phrases detected by activation phrase detection module 231 may include any call words or wake words, or other words, phrases, or sentences, included in corpus of activation phrases 211, such as names associated with each of first IPA service 140, second IPA service 150, and third IPA service 160. When activation phrase detection module 231 detects one or more activation phrases in audio signal 101, activation phrase detection module 231 transmits audio signal 101 to voice data splitter module 232, as shown.

In some embodiments, activation phrase detection module 231 is also configured to determine which of first IPA service 140, second IPA service 150, and/or third IPA service 160 is referenced in audio signal 101. In such embodiments, activation phrase detection module 231 transmits metadata 301 along with audio signal 101 to voice data splitter module 232, as shown. Metadata 301 indicates which activation phrase detected in audio signal 101 is associated with which portions of audio signal 101 that do not include an activation phrase. In addition, metadata 301 may indicate which of first IPA service 140, second IPA service 150, and/or third IPA service 160 is referenced in audio signal 101. Alternatively, voice data splitter module 232 may be configured to determine which IPA services are referenced in audio signal 101.

Voice data splitter module 232 is configured to receive audio signal 101 from activation phrase detection module 231 and separate any activation phrases included in audio signal 101 from query content. Query content includes words and/or phrases detected in audio signal 101 that are not recognized as part of an activation phrase. Voice data splitter module 232 then transmits query content 302 to query processing module 233. In some embodiments, voice data splitter module 232 first converts query content 302 to text before transmitting to query processing module 233, whereas, in other embodiments, voice data splitter module 232 transmits query content 302 as the portion or portions of audio signal 101 that are not considered an activation phrase. Thus, query content 302 may include text-based data and/or may include one or more audio signals. It is noted that voice data splitter 232 may transmit query content 302 to query processing module 233 as multiple audio signals extracted from audio signal 101, since activation phrases may occur at multiple points within audio signal 101 that are not necessarily at the beginning or ending of audio signal 101.

In some embodiments, voice data splitter module 232 also transmits metadata 303 to query processing module 233 along with query content 302. Metadata 303 associates each portion of query content 302 with a particular target IPA service, based on the one or more activation phrases detected in audio signal 101. For example, when user 90 issues a simple query to a single IPA service, such as "Hey Google, what is the weather in San Francisco?," metadata 303 indicates that the IPA service Google Home™ is the destination for the query content "what is the weather in San Francisco?" In another example, when user 90 issues the same query to multiple IPA services, such as "Hey Google and Alexa, what is the weather in San Francisco?," metadata 303 indicates that the IPA service Google Home™ and the IPA service Amazon Alexa™ are each a destination for the query content "what is the weather in San Francisco?" In yet another example, when user 90 issues different queries or commands to different IPA services, such as "Hey Google what is my schedule today, and Siri, play some music from my playlist," metadata 303 indicates that the IPA service Google Home™ is the destination for the query content "what is my schedule today" and Apple Siri™ is the destination for the query content "play some music from my playlist." Thus, in such embodiments, the content of metadata 303 generally varies depending on the complexity of the commands and/or queries included in audio signal 101.

Query processing module 233 is configured to construct a voice input 304 for one or more IPA services based on query content 302, and to transmit voice input 304 and metadata 305 to IPA management module 234 as shown. Specifically, query processing module 233 generates a voice input 304 for each IPA service that is targeted to receive query content in metadata 303, based on query content 302. In some embodiments, voice input 304 is an audio signal or file that is transmitted to some or all IPA services targeted to receive query content, such as a way or mpeg file. For example, in some embodiments, to generate voice input 304, query processing module 233 is configured to extract an appropriate portion of audio signal 101, i.e., the portion of audio signal 101 that includes the query content 302 associated with a particular IPA service. In a scenario in which audio signal 101 includes a different query or command for each of multiple IPA services, voice input 304 includes a different audio signal or file for each different IPA service. Metadata 305 indicates which voice input 304 is associated with which IPA service, so that IPA management module 234 can route the one or more audio signals or files included in voice input 304 appropriately.

In addition, in some embodiments, query processing module 233 is configured to detect change listener commands included in query content 302, determine to what listener (i.e., what IPA service) user 90 intends to direct a previously issued query or command, and modify metadata 305 accordingly. Thus, in such embodiments, metadata 305 also indicates which voice input 304 is associated with an IPA service that is indirectly referenced by a change listener command. In such embodiments, query processing module 233 generally relies on corpus of change listener commands 212 when analyzing query content 302. Because corpus of change listener commands 212 is a relatively limited set of possible target words or phrases, speech recognition results from query processing module 233 generally have a high likelihood of being accurate.

In one embodiment in which a change listener command is recognized by query processing module 233, user 90 may make a compound request in which the same query or command is directed to multiple IPA services, but uses more conversational syntax than is currently acceptable by conventional IPA speech recognition: "Hey Google, what is the weather in San Francisco? Alexa, what do you think?" In this instance, query processing module 233 is configured to recognize the call word "Alexa" and the change listener command "what do you think?" associated with that call word. In response to recognizing that the call word Alexa is associated with a change listener command included in corpus of change listener commands 212, query processing module 233 modifies metadata 305 to indicate that the voice input 304 to be transmitted to the IPA service Google Home™, includes the query "what is the weather in San Francisco?" and the voice input 304 to be transmitted to the IPA service Amazon Alexa™ includes the query most recently issued by user 90, i.e., the query "what is the weather in San Francisco?" As a result, a query or voice command that is intended for multiple IPA services but is included in a complex verbal utterance from user 90 can still be directed to the appropriate IPA services.

In another embodiment in which a change listener command is recognized by query processing module 233, query processing module 233 is configured to determine that a voice command or query that is not directly associated with an activation phrase is associated with a voice command that was previously issued by user 90. That is, in such embodiments, query processing module 233 is configured to interpret the lack of an activation phrase for a particular query or voice command as a change listener command that references an IPA service that can perform the voice command or query. In such embodiments, query processing module 233 is configured to contextually determine the IPA service to which such an unassociated voice command or query is directed. Thus, based on previously issued voice commands and/or queries, and/or on what processes are currently being controlled by particular IPA services, query processing module 233 can determine to what IPA service to direct a voice command or query in query content 302 that is not associated with an activation phrase.

For instance, when user 90 has previously issued a voice command to a particular IPA service regarding a particular task, such as "Siri, play something off my playlist," the user may subsequently issue a voice command or query that is recognized by query processing module 233 as not associated with an activation phrase, such as "Stop," "stop playing music," "reduce volume," "what is the name of this song?,"

etc. In such an instance, query processing module 233 contextually determines that Apple Siri™ is the intended target of such an unassociated voice command or query. In response to making this determination, query processing module 233 generates a specific voice input 304 that includes the unassociated voice command, and modifies metadata 305 to indicate that specific voice input 304 is to be transmitted to the IPA service Apple Siri™. As a result, a query or voice command issued by user 90 that is not associated with an activation phrase can still be directed to the appropriate IPA service based on a contextual determination made by query processing module 233. It is noted that such an unassociated query or voice command may be included in a more complex verbal utterance 91 that includes one or more queries or voice commands that are associated with detectable activation phrases.

IPA communications management module 234 is configured to manage interfaces with first IPA service 140, second IPA service 150, and third IPA service 160. Specifically, IPA communications management module 234 transmits appropriate voice input 304 to one or more of first IPA service 140, second IPA service 150, and third IPA service 160, based on metadata 305. As shown, the appropriate voice input 304 is transmitted to first IPA service 140 via first IPA client 121, to second IPA service 150 via second IPA client 122, and to third IPA service 160 via third IPA client 123. Voice input 304 may be transmitted to the appropriate IPA service as a sound file or other sound data, or as text-based data, depending on the requirements of that particular IPA service.

In addition, IPA communications module 234 is configured to manage any response audio signal 306 received from one or more of first IPA service 140, second IPA service 150, and third IPA service 160. Response audio signals 306 are generated by one or more of first IPA service 140, second IPA service 150, and third IPA service 160 in response to voice input 304 from IPA communications management module 234. Thus, when multiple IPA services receive a voice input 304 from IPA communications management module 234, multiple response audio signals 306 are likely to be received by IPA communications management module 234 at the same time or at overlapping times. IPA communications management module 234 therefore manages the order in which each response audio signal 306 that is received is played back to user 90 via loudspeaker 125.

In some embodiments, IPA communications module 234 is configured to order the playback of multiple response audio signals 306 in the order in which the IPA services originating were referenced by activation phrases and/or change listener commands in audio signal 101. In other embodiments, IPA communications module 234 is configured to order the playback of multiple response audio signals 306 in the order in which the multiple response audio signals 306 are received. In yet other embodiments, a default order of playback may be implemented by IPA communications module 234, in which a predefined order of IPA services is used to determine the order in which the multiple response audio signals 306 are played back. In such embodiments, the predefined order may be a user-selected order of IPA services.

In embodiments in which one or more of first IPA service 140, second IPA service 150, or third IPA service 160 returns response audio signals 306 as text-based data, IPA communications module 234 is configured to convert such text-based data to an audio signal that can be played back by loudspeaker 125. Any technically feasible text-to-speech application or other artificial production of human speech can be employed by IPA communications module 234 to accomplish such a conversion.

In sum, when user 90 interacts with smart device 120 in a conversational and natural way, the various queries and/or commands that may be included in a single audio signal 101 can each be separately extracted and then routed to the appropriate IPA service. Furthermore, the multiple responses returned by these IPA services are managed, for example by saving an audio file received from each IPA service, so that the multiple responses are subsequently played in series.

Figure 4:
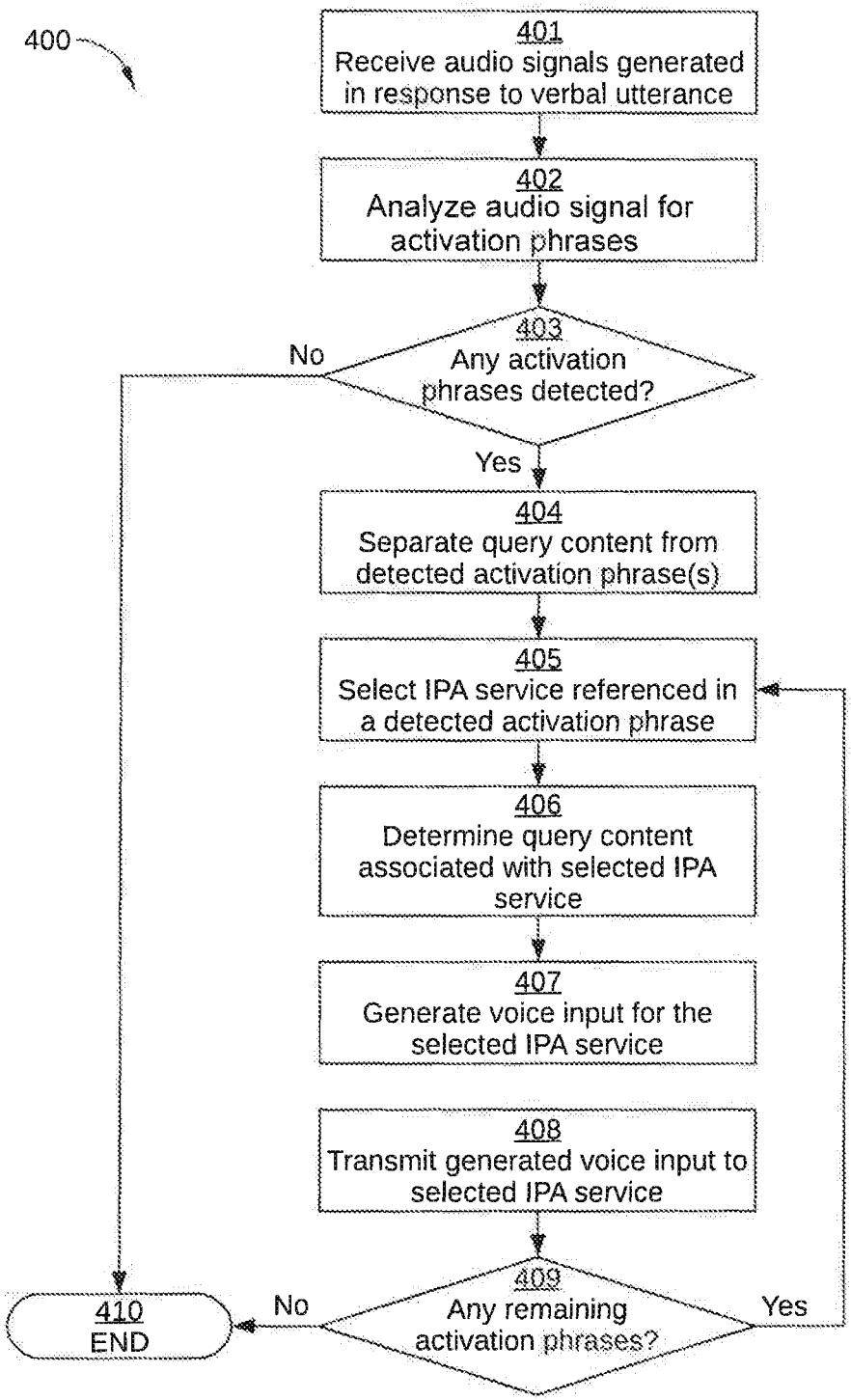
FIG. 4 sets forth a flowchart of method steps for performing speech recognition, according to various embodiments of the present disclosure.

FIG. 4 sets forth a flowchart of method steps for performing speech recognition, according to various embodiments of the present disclosure. Although the method steps are described with respect to the systems of FIGS. 1-3, persons skilled in the art will understand that any system configured to perform the method steps, in any order, falls within the scope of the various embodiments.

As shown, a method 400 begins at step 401, in which IPA management application 130 receives an audio signal generated in response to verbal utterance 91 from user 90. For example, in one embodiment, IPA management application 130 receives audio signal 101 from microphone 126.

In step 402, IPA management application 130 analyzes audio signal 101 for activation phrases. For example, step 402 may be performed by activation phrase detection module 231. In some embodiments, in step 402 IPA management application 130 employs a speech recognition algorithm in conjunction with corpus of activation phrases 211. It is noted that the various activation phrases included in corpus of activation phrases 211 are associated with a group of candidate IPA services that includes IPA services with which IPA management application 130 is configured to interact, i.e., first IPA service 140, second IPA service 150, and third IPA service 160. In some embodiments, IPA management application 130 also employs corpus of change listener commands 212 in step 402. In such embodiments, IPA management application 130 can detect in audio signal 101 that a user who uttered at least one activation phrase associated with one IPA service is switching direction of voice commands to a different IPA service.

In some embodiments, IPA management application 130 also determines which of first IPA service 140, second IPA service 150, and/or third IPA service 160 is referenced by the activation phrases(s) detected in step 402.

In step 403, IPA management application 130 determines whether any activation phrases (or change listener commands) are included in audio signal 101. If no, method 400 proceeds to step 410 and ends; if yes, method 400 proceeds to step 404.

In step 404, IPA management application 130 separates query content in audio signal 101 from the activation phrase(s) detected in step 402. For example, step 404 may be performed by voice splitter module 214.

In step 405, IPA management application 130 selects an IPA service that is referenced by one of the activation phrases detected in step 402. Generally, the IPA service is included in the group of possible candidate IPA services with which IPA management application 130 is configured to interact.

In step 406, IPA management application 130 determines what query content 302 is associated with the IPA service selected in step 405. For example, step 406 may be performed by query processing module 234.

In step 407, IPA management application 130 generates a voice input 304 for the IPA service selected in step 405. In some embodiments, in step 407 IPA management also generates metadata 305 indicating that the voice input generated in step 407 is to be transmitted to the selected IPA service.

In step 408, IPA management application 130 transmits the voice input 304 generated in step 407 to the appropriate IPA service, as indicated in metadata 305. In some embodiments, the voice input 304 is transmitted to the appropriate IPA service via one of first IPA client 121, second IPA client 121, or third IPA client 123, since the IPA client that corresponds to that IPA service is configured to transmit data to and receive data from that IPA service via the requisite protocols.

In step 409, determines whether there are any activation phrases remaining for which no IPA service or query content 302 has been associated. If yes, method 400 proceeds back to step 405; if yes, method 400 proceeds to step 410 and ends.

Figure 5:
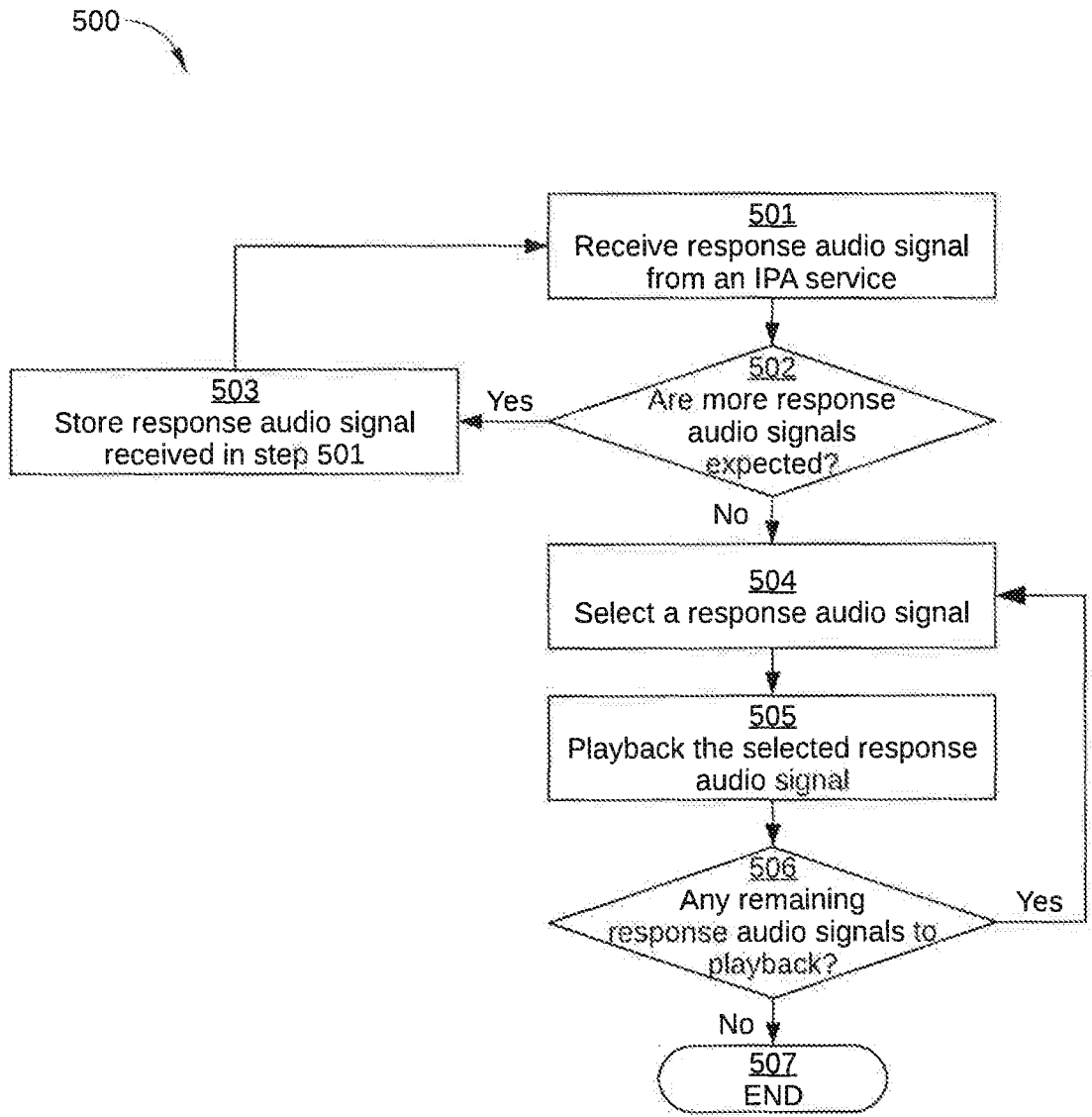
FIG. 5 sets forth a flowchart of method steps for managing responses from multiple IPA services, according to various embodiments of the present disclosure.

FIG. 5 sets forth a flowchart of method steps for managing responses from multiple IPA services, according to various embodiments of the present disclosure. Although the method steps are described with respect to the systems of FIGS. 1-4, persons skilled in the art will understand that any system configured to perform the method steps, in any order, falls within the scope of the various embodiments.

In step 501, IPA management application 130 receives response audio signal 306 from an IPA service, such as one of first IPA service 140, second IPA service 150, or third IPA service 160. The response audio signal 306 may be, for example, an audio file to be played back by a smart device or a text-based file that is to be converted to an audio signal for play back by the smart device. The response audio signal 306 includes a response to an audio signal that includes a voice command, query, or other query content previously received by IPA management application 130, such as audio signal 101. Specifically, the response audio signal 306 received in step 501 is in response to the voice command, query, or other query content included in the previously received audio signal 101.

In step 502, IPA management application 130 determines whether any more audio signals are expected in response to the voice command, query, or other query content of audio signal 101. If yes, method 500 proceeds to step 503; if no, method 500 proceeds to step 504.

In step 503, IPA management application 130 stores the response audio signal 306 received in step 501, for example in memory 210 and/or storage 215. Method 500 then proceeds back to step 501.

In step 504, IPA management application 130 selects a response audio signal 306 that was received in an iteration of step 501. In some embodiments, the particular response audio signal 306 that is selected is based on a specific playback order. For example, in some embodiments, IPA management application 130 selects the response audio signal 306 based on the order in which the IPA services were referenced by activation phrases and/or change listener commands in the previously received audio signal 101. In other embodiments, IPA management application 130 selects the response audio signal 306 based on the order in which the multiple response audio signals 306 are received. In other embodiments, IPA management application 130 selects the response audio signal 306 based on a default order of playback, such as a user-selected order of playback.

In step 505, IPA management application 130 plays back the response audio signal 306 selected in 504. In some embodiments, IPA management application 130 first converts text-based data included in the selected response audio signal 306 into an audio data format to enable playing back the response audio signal 306.

In step 506, IPA management application 130 determines whether there are remaining response audio signals 306 to be played back to user 90. If yes, method 500 proceeds back to step 505; if no, method 500 proceeds to step 507 and ends.

In sum, various embodiments set forth techniques that enable a user to employ voice commands to access multiple IPA services from a single smart device. Activation phrases are detected in an audio signal generated in response to a user voice command, and query content is separated from the detected activation phrases. Each activation phrase is then associated with specific query content, and that query content is transmitted to an IPA service associated with the activation phrase.

At least one advantage of the disclosed embodiments is that a user can issue one voice command to multiple IPAs via a single smart device, and play back the respective responses in a particular order. A further advantage is that the user can issue such voice commands with more natural and conversational syntax than that allowed by conventional techniques.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The claimed invention is:

1. One or more non-transitory computer-readable storage media including instructions that, when executed by one or more processors, cause the one or more processors to perform the steps of:
    receiving a first response to a first user input, comprising:
        detecting an activation phrase within a first audio signal included in the first user input;
        selecting, based on the activation phrase, a first intelligent personal assistant (IPA) that is included in a group of candidate IPAs;
        extracting query content from the first audio signal;
        generating a second audio signal based on the query content;
        transmitting the second audio signal to the first IPA;
        receiving, from the first IPA, a first response audio signal; and
        storing the first response audio signal as the first response;
    after storing the first response audio signal from the first IPA, receiving a second response to the first user input, comprising:
        detecting a change listener command in a third audio signal, wherein the change listener command comprises a word or phrase directing the query content to an additional IPA included in the group of candidate IPAs;
        selecting, based on the change listener command, a second IPA based on the change listener command;
        transmitting the second audio signal to the second IPA;
        receiving, from the second IPA, a second response audio signal; and
        storing the second response audio signal as the second response;
    determining, based on the change listener command, a playback order that provides the second response before providing the first response; and
    causing, based on the playback order, the second response audio signal to be played before causing the first response audio signal to be played.

2. The one or more non-transitory computer-readable storage media of claim 1, further comprising instructions that, when executed by one or more processors, cause the one or more processors to perform the steps of:
    detecting an additional activation phrase in the first audio signal; and
    based on the additional activation phrase, selecting an additional IPA that is included in the group of candidate IPAs.

3. The one or more non-transitory computer-readable storage media of claim 2, further comprising instructions that, when executed by one or more processors, cause the one or more processors to perform the step of transmitting the second audio signal to the additional IPA.

4. The one or more non-transitory computer-readable storage media of claim 2, further comprising instructions that, when executed by one or more processors, cause the one or more processors to perform the steps of:
    extracting additional query content from the first audio signal that is associated with the additional activation phrase;
    generating, based on the additional query content, a fourth audio signal that includes the additional query content; and
    transmitting, to the additional IPA, the fourth audio signal.

5. A system comprising:
    a memory storing an intelligent personal assistant (IPA) management application; and
    one or more processors that are coupled to the memory and execute the IPA management application to:
        receive a first response to a first user input, comprising:
            detecting an activation phrase within a first audio signal included in the first user input;
            selecting, based on the activation phrase, a first intelligent personal assistant (IPA) that is included in a group of candidate IPAs;
            extracting query content from the first audio signal;
            generating a second audio signal based on the query content;
            transmitting the second audio signal to the first IPA;
            receiving, from the first IPA, a first response audio signal; and
            storing the first response audio signal as the first response;
        after storing the first response audio signal from the first IPA, receive a second response to the first user input, comprising:
            detecting a change listener command in a third audio signal, wherein the change listener command comprises a word or phrase directing the query content to an additional IPA included in the group of candidate IPAs;

selecting, based on the change listener command, a second IPA based on the change listener command;
transmitting the second audio signal to the second IPA;
receiving from the second IPA, a second response audio signal;
storing the second response audio signal as the second response;
determine, based on the change listener command, a playback order that provides the second response before providing the first response; and
cause, based on the playback order, the second response audio signal to be played before causing the first response audio signal to be played.

6. The system of claim 5, wherein the one or more processors further execute the IPA management application to:
detect a second change listener command in the first audio signal;
determine, based on the second change listener command, a third IPA included in the group of candidate IPAs;
extract additional query content from the first audio signal;
generate, based on the additional query content, a fourth audio signal that includes the additional query content; and
transmit, to the third IPA, the fourth audio signal.

7. The system of claim 6, wherein the additional query content includes a voice command.

8. The system of claim 6, wherein determining the third IPA based on the second change listener command comprises determining the third IPA based on at least one of:
a previously-issued voice command,
a previously-issued voice query, or
which process is currently being controlled by an IPA service.

9. The system of claim 8, wherein determining the third IPA based on the previously-issued voice command comprises determining that the third IPA is an IPA that received a previously-issued voice command via the second audio signal.

10. The system of claim 8, wherein determining the third IPA based on which process is currently being controlled by the IPA service comprises determining that the third IPA is controlling the process.

11. A method for responding to a speech input, the method comprising:
receiving a first response to a first user input, comprising:
detecting an activation phrase within a first audio signal included in the first user input;
selecting, based on the activation phrase, a first intelligent personal assistant (IPA) that is included in a group of candidate IPAs;
extracting query content from the first audio signal;
generating a second audio signal based on the query content;
transmitting the second audio signal to the first IPA;
receiving, from the first IPA, a first response audio signal; and
storing the first response audio signal as the first response;
after storing the first response audio signal from the first IPA, receiving a second response to the first user input, comprising:
detecting a change listener command in a third audio signal, wherein the change listener command comprises a word or phrase directing the query content to an additional IPA included in the group of candidate IPAs;
selecting, based on the change listener command, a second IPA based on the change listener command;
transmitting the second audio signal to the second IPA;
receiving, from the second IPA, a second response audio signal;
storing the second response audio signal as the second response;
determining, based on the change listener command, a playback order that provides the second response before providing the first response; and
causing, based on the playback order, the second response audio signal to be played before causing the first response audio signal to be played.

12. The method of claim 11, further comprising:
detecting an additional activation phrase in the first audio signal; and
based on the additional activation phrase, selecting a second IPA that is included in the group of candidate IPAs.

* * * * *